INVENTOR
REUBEN E. MAINE
BY
WATSON, COLE, GRINDLE & WATSON
ATTORNEYS

United States Patent Office 3,343,169
Patented Sept. 19, 1967

3,343,169
LORAN CONTROL AND TIMING CIRCUITS
Reuben E. Maine, Albemarle County, Va., assignor to Electronic Concepts, Inc., Charlottesville, Va., a corporation of Virginia
Filed Aug. 26, 1965, Ser. No. 482,744
10 Claims. (Cl. 343—103)

ABSTRACT OF THE DISCLOSURE

Loran timing controls utilizing counters with 1-2-4-5 mode of operation to measure delays between pulses from two loran transmitters provide a simplified and accurate system. A simplified drift control circuit converts a single counter stage to add or subtract pulses for phasing signal trains. Control pulses are derived from an oscillator frequency controlled from received loran pulses to add accuracy and phasing. The resulting system is simplified with few stages and does not give up accuracy for low cost, and is extremely versatile in handling all standard signals with a simple counter chain deriving two preset counts.

---

This invention relates to loran systems and more particularly it relates to control and timing circuits in loran receivers.

In loran receivers it is necessary to provide accurate metering of pulses received from two different transmission stations in order to closely approximate the position of the receiver. It is difficult to provide simple and yet effective control and timing circuits which maintain system accuracy because of inherent delays and waveform distortions encountered in circuits processing received loran signal pulses.

One manner of increasing the accuracy of a loran receiver is to provide simplified, efficient control circuits having as few processing steps as possible. Another factor in increasing accuracy is the processing of as many of the pertinent operations through the same channels as possible in order to provide uniform timing bases throughout the system. Yet another factor in producing accurate waveforms for timing and control purposes is timing of individual control signals by synchronization with the transmitted pulses.

Thus, it is a general object of the invention to provide improved and simple but accurate loran receiving equipment.

A more specific object of the invention is to reduce the number of steps in processing control waveforms in loran receiving equipment.

Another specific object of the invention is to produce control and timing waveforms which are accurately synchronized with received loran pulses without introduction of significant timing errors in the control circuits.

Still another object of the invention is the provision of loran receiving equipment in which the significant functional operations and control waveforms are processed through a common timing system providing uniformly referenced control periods.

Basically a loran receiver in operation serves to generate accurate repetitive processing periods of variable length known as pulse repetition rates, which correspond to the several standard transmissions available. It should have simplified control systems which provide selectivity over a range permitting operation with any of the standard loran transmissions which might be encountered in either of two systems known as Loran A and Loran C.

In this respect the receiver has multi-frequency operational capabilities in the following bands:

|  | Kilocycles |
|---|---|
| Channel 1 | 1950 |
| Channel 2 | 1850 |
| Channel 3 | 1900 |
| Loran C | 100 |

In order to match the transmitted pulse repetition rates, the loran receiver should also be able to reproduce internal operation which conforms to the following standards or Basic Pulse Repetition Rates (BPRR):

| Designation BPRR | Frequency (cycles per second) | Timing Period (microseconds) | |
|---|---|---|---|
| | | Loran A | Loran C |
| SS | 10 | | 100,000 |
| SL | 12½ | | 80,000 |
| SH | 16⅔ | | 60,000 |
| S | 20 | 25,000 | 50,000 |
| L | 25 | 20,000 | 40,000 |
| H | 33⅓ | 15,000 | 30,000 |

Furthermore provisions must be made to alter the Basic Pulse Repetition Rates by amounts designated as Specific Pulse Repetition Rates (SPRR). In this respect the operation is typified for the basic rate H and the other periods are similarly modified by designation of specific rates. Note that Loran C is just double the timing period for Loran A in the basic rates S, L, and H. The exact pulse repetition rates therefore are correlated as follows:

| SPRR: | Period (microseconds) |
|---|---|
| 0 | 30,000 |
| 1 | 29,900 |
| 2 | 29,800 |
| 3 | 29,700 |
| 4 | 29,600 |
| 5 | 29,500 |
| 6 | 29,400 |
| 7 | 29,300 |

Several basic functions must be performed within the loran receiver to provide accurate positional information by reference to information printed in terms of time difference hyperbolae on standard loran hydrographic charts. Thus the difference in time between pulses received from two different transmission stations must be accurately measured to enable the operator to locate the hyperbola on the chart having the same time difference. By using two different loran transmission signal pairs a fix can be taken to identify position of the receiver. Thus it is necessary to provide the ability to receive and process signals to accurately determine time differences between pulse pairs which may occur in different ones of the available standard transmissions. Also it is clear that any inaccuracies produced in processing the signals or measuring the time differences result in position errors.

Accordingly the provision for an accurate time difference measure is a basic functional requirement of the loran receiver system.

Another functional operation that is desirable is a drift control. Since the receiver is locked in or synchronized with transmitted pulses, the received pulses (which are generally displayed on a time scale such as an oscilloscope trace for viewing by the operator) are stationary. The drift control provides for moving the pulses in either direction relative to the time scale.

The loran receiver system provided in accordance with this invention provides the above described timing, control and functional operation in a simplified configuration which has as its central operation portion a master oscillator synchronously controlled from received loran signals, and a frequency dividing multi-stage counter chain for deriving the various functional and control signals as well as the required pulse repetition rates.

The counter itself is simplified significantly by providing binary-coded-decimal counters operating in a 1–2–4–5 counting mode. This not only provides fewer interconnection and data processing circuits within the counter chain, but additionally serves with the system organization to simplify peripheral equipment by producing a series of transition waveforms representing division of the master oscillator frequency by five.

This type of counter chain permits derivation of the pulse repetition frequency by choosing a basic rate (BPRR) and presetting the counter chain to subtract a specific rate (SPRR) in a simplified and versatile configuration.

In order to provide control and timing signals within the system which are not deteriorated in accuracy by delays within the counter chain or other signal processing circuits, the master timing pulses are obtained from the frequency controlled oscillator before encountering significant delays or shape modification in a cascaded series of waveform processing circuits. In a similar manner the time metering circuit for measuring pulse separation is operated. Thus, system operation is provided with timing accuracies exceeding those generally encountered in frequency division circuits.

The functional operations and drift controls are related to the same central counter chains from which the pulse repetition rate controls are derived to provide the same reference base and simplified circuits providing several interrelated functions. In this fashion, the drift control simply operates to decrease or increase temporarily as desired the oscillator pulses introduced into the counter chain.

Various aspects of the invention including its organization and further features and advantages are incorporated in the following more detailed description which refers to the accompanying drawings, wherein.

Figure 1:
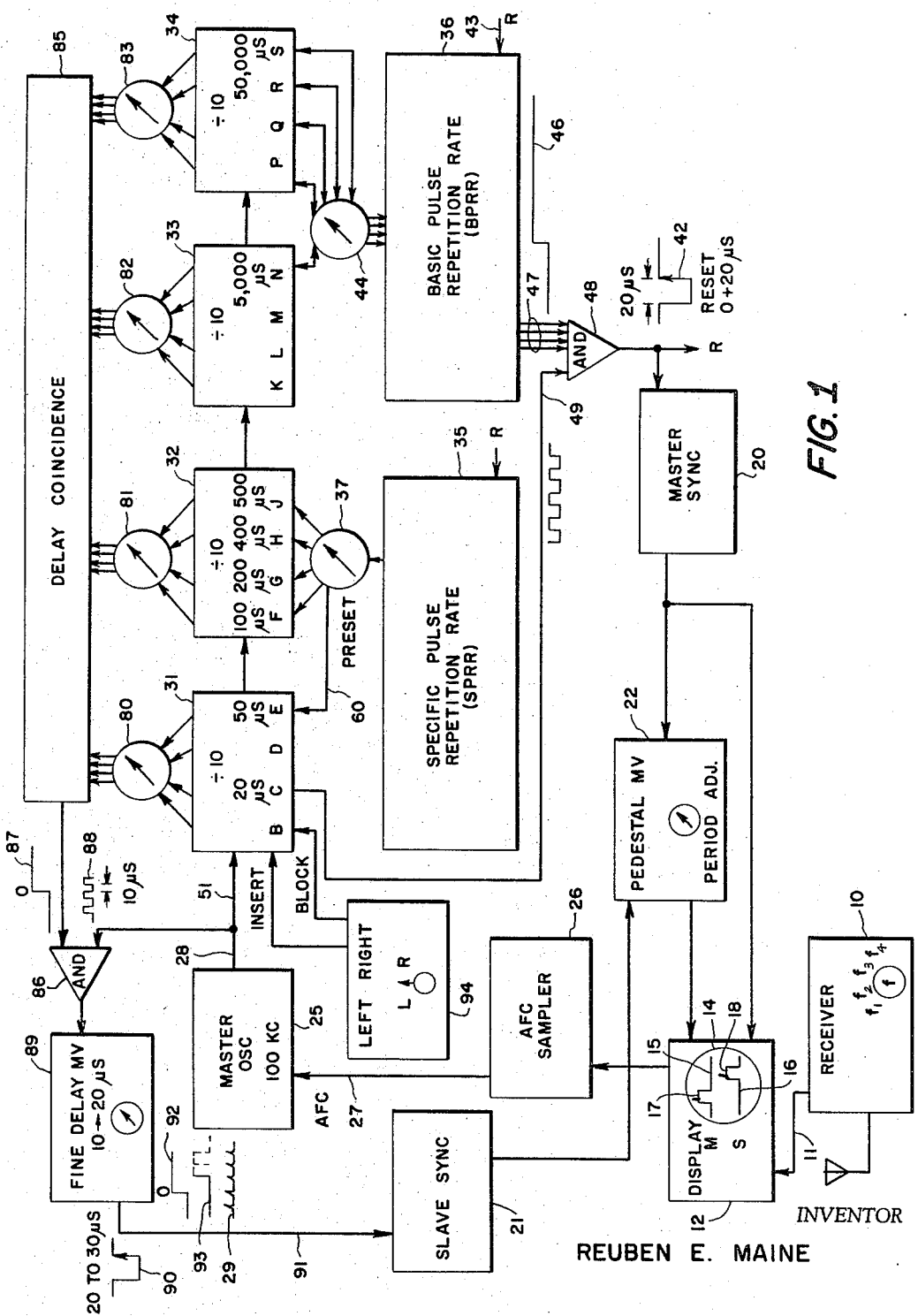
FIGURE 1 is a block system diagram of a loran receiver system afforded by the invention.

With reference to the system diagram of FIGURE 1, the various circuit configurations which are conventional and within the realm of those skilled in the loran art are shown only in block form. For example, the receiver 10 is of conventional design, supplying received loran pulses on lead 11 to display means 12. The display means 12 is a conventional oscilloscope type monitor having screen 14 which provides a time reference on a pair of timed and synchronized traces or sweeps 15, 16 respectively displaying received loran pulses 17, 18 from two different stations on pedestals which are derived respectively from master (M) timing control circuits 20 and slave (S) timing control circuits 21 by way of a pedestal multivibrator circuit 22.

Also the master oscillator 25 is conventionally controlled for synchronous operation with loran pulses received on receiver 11, by way of a sampling circuit 26 and automatic frequency control (AFC) lead 27. The oscillator is a stable crystal controlled oscillator adapted for synchronous operation and may have any desired frequency which is a multiple of 100 kilocycles, but for purpose of this system provides a basic output signal at lead 28 at a frequency of 100 kilocycles, which may be in the form of pulses 29, for example. The remainder of the system shown in FIGURE 1 having reference characters greater than 30 is more particularly related to the provisions of the present invention, and thus will be described in greater detail.

Figure 2:
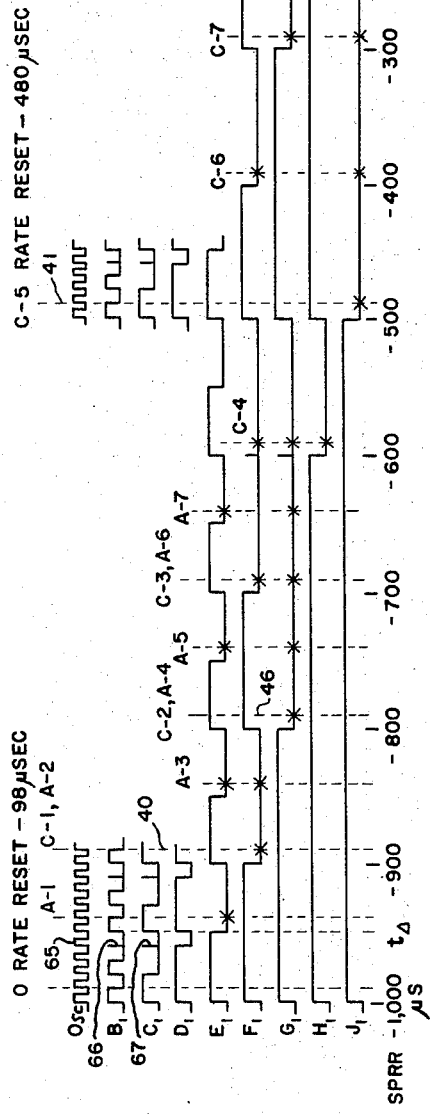
FIGURES 2 and 3 are waveform charts relating the various control functions to the corresponding circuits.
Figure 3:
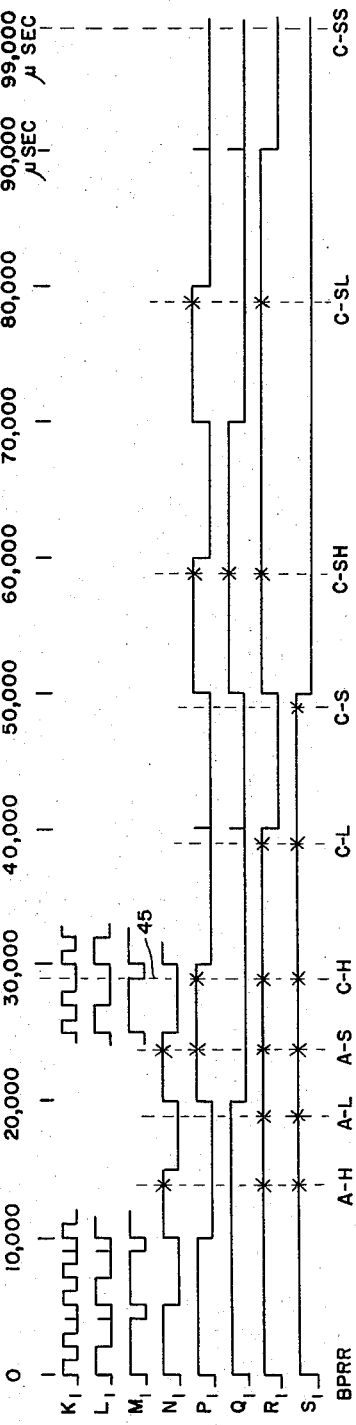

The waveforms of FIGURES 2 and 3 are referenced to the block diagram of FIGURE 1 by cross notation and will be discussed concurrently. For example, the counter chain comprising four sets of cascade connected binary-coded-decimal counters 31–34, is divided into binary counter stages B, C, D through S referring to corresponding waveforms in FIGURES 2 and 3. Also reference is made to the various loran standard periods such as A–H or C–SS referring respectively to the hereinbefore described Loran A with a basic repetition rate H and Loran C with a basic repetition rate SS. Likewise C–3 refers to the specific repetition rate 3 as used in Loran C.

For purpose of understanding the operation of the system afforded by this invention, refer to the basic time 0 (zero) at the right of FIGURE 2, from which the specific pulse repetition rates are referenced in terms of minus 100 microsecond increments. This (zero) 0 time corresponds with that at the left of FIGURE 3 representing the basic pulse repetition rates where the dashed lines indicate the points at which counters referenced by asterisks are changed in state by reset pulses to establish the corresponding basic pulse repetition rates. Note that these occur at the BPRR minus 1000 microseconds so that the display of FIGURE 2 can be interposed at the left of FIGURE 3 to show the complete actual pulse repetition rate derived from combination of SPRR and BPRR operations in respective blocks 35 and 36 of FIGURE 1.

In essence therefore the SPRR circuit 35 serves to selectively channel pulses preset one or more counter stages E through J by means of control switch 37 at a time established by operation of a reset pulse entered at terminal R. This control switch has eight positions 0–7 corresponding to the SPRR notation which are different for Loran C and Loran A. However, some preset positions are identical so that a switch selecting the preset conditions of the proper number of counters E through J for eleven different positions 950, 900, 850, etc., will suffice. Thus for A–2 and C–1 commonly referenced at line 40, for example, only counter F need be preset. This can be referenced in term of preset times in the following chart:

| SPRR | Loran A | Loran C |
|------|---------|---------|
| 0 | 1,000 | 1,000 |
| 1 | 950 | 900 |
| 2 | 900 | 800 |
| 3 | 850 | 700 |
| 4 | 800 | 600 |
| 5 | 750 | 500 |
| 6 | 700 | 400 |
| 7 | 650 | 300 |

For other circuits various combinations of counter stages are preset as denoted by the asterisks at the corresponding dotted time lines in FIGURE 2.

This difference in presetting occurs since in Loran A, each operating cycle is divided into two equal periods of time with a master control pulse and a slave control pulse. The delay is always measured from the second half of the cycle and thus the counter will count through twice, each time subtracting half the required SPRR.

As noted at C–5 line 41, the reset occurs twenty microseconds away from the SPRR, that is at 480 microseconds rather than 500. The reasons for this will be explained hereinafter in connection with the derivation of the reset pulses 42 at lead R, which are used to reset and preset the counter stages. The reset operation of the counter stages N–S is accomplished in BPRR circuit 36 as shown by the designation R at lead 43, which permits the selected stages of counters 33 and 34 to be restored to start position at the upswing (noted by the arrow) on reset waveform 42. In general all waveform transitions are generated in this typical embodiment by a positive pulse.

Thus the switching circuit 44 serves to establish the BPRR timing as designated for the nine referenced switch positions at dashed lines 45, etc., in FIGURE 3 by presetting one or more counter stages as denoted by the asterisks. Thus, circuit 36 serves merely to relay reset pulses R to one or more counter stages N through S. Assuming the mode of operation for C–H, with $$SPRR = C-2$$

the counters would be preset to give a nominal "minus" count of 800 microseconds from line 46 and would be reset at line 45 for a pulse repetition frequency of 29,800 microseconds. Similarly any other combination of SPRR and BPRR designated can be selected with switches 37 and 44 to provide the master timing waveform 46 at the output leads 47 of the BPRR circuit 36. Basically this is derived from stages N–S which are passed through switch 44 into coincident circuit 48.

To provide accuracy in the system the master timing waveform 46 is gated aganst the output of counter stage C provided at lead 49, resulting in the reset waveform 42 with a trailing edge occurring roughly twenty microseconds after the timing period, but precisely timed with the master oscillator frequency since delays and waveform distortion encountered in counter stage B are very slight as compared with various delays and changes of timing or accuracy provided in the cascaded stages of the central counter as reflected in waveform 46. This twenty microsecond difference in timing is that referred to on line 41 of FIGURE 2 noting the difference in timing on the SPRR of C–5 from the nominal 500 microseconds.

It may be seen from analysis of the loran basic and specific pulse repetition rates, that with the oscillator frequency output of 100 kilocycles, it is necessary to obtain a division by five for many operations in this system embodiment. For example the preset (SPRR) conditions A–1, A–3, A–5, and A–7 require 50 microsecond transitions derived from counter stage E; the 500 microsecond transitions at counter stage J are used for C–5 and outputs of both stages N and S are used in deriving the BPRR conditions. In order to provide these signals efficiently with minimal circuits, the counters in this invention are caused to operate in a 1–2–4–5 mode of binary-coded-decimal counting.

Figure 4:
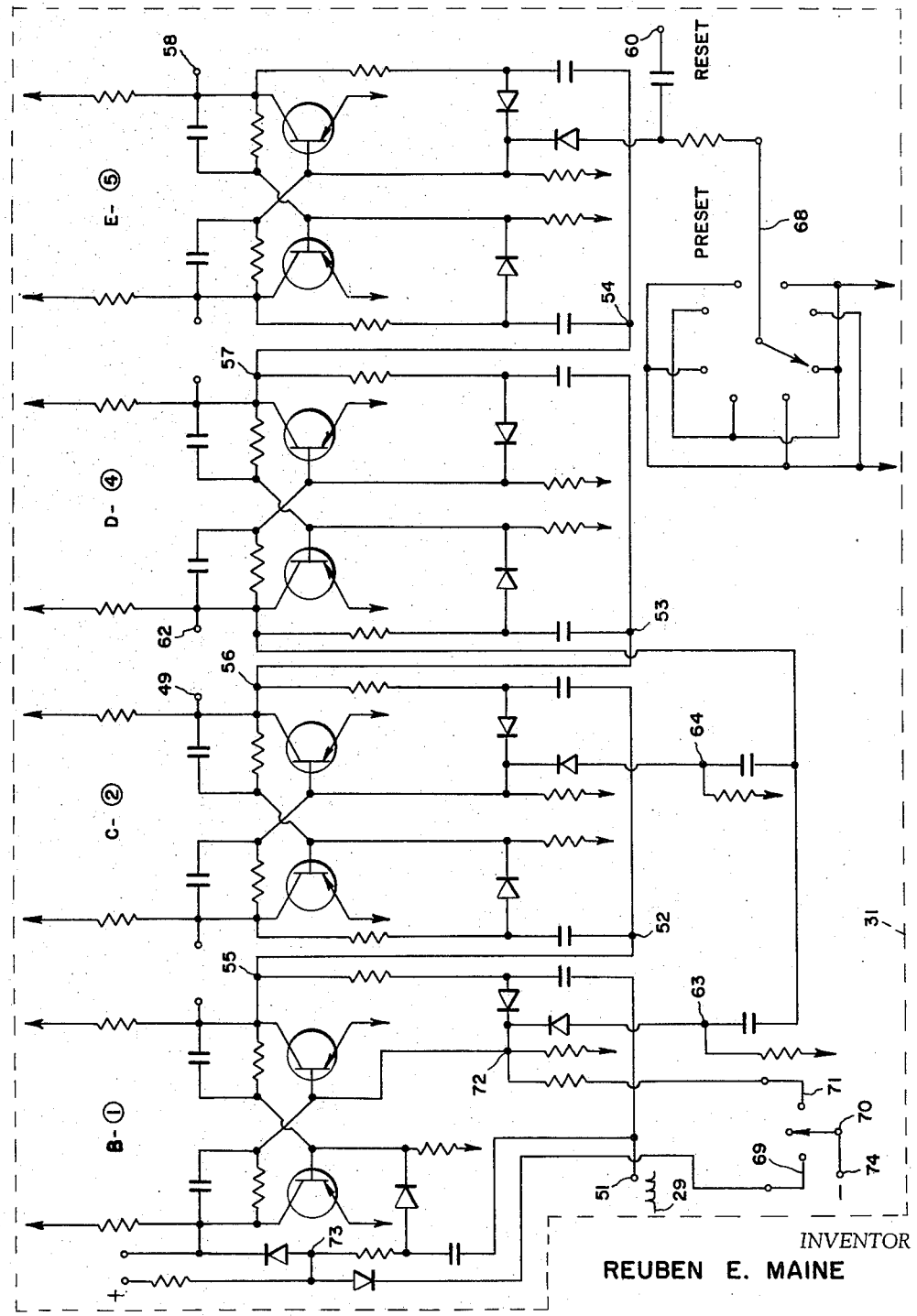
FIGURE 4 is a schematic circuit diagram of the basic counter configuration provided in accordance with one aspect of the invention.

This operation may be seen from the counter of FIGURE 4 which has four stages connected for the (1)–(2)–(4)–(5) weighting of input pulses. Only the initial counter 31 is illustrated in detail since the other counters 32–34 are similar in operation.

Each counter stage is a binary counter having a complementing input lead 51, 52, 53, 54 responsive to a positive going transition as shown from pulse train 29 derived from the master oscillator at 100 kilocycles. As shown the four stages are cascade coupled with each output lead 55, 56, 57 of a preceding stage coupled to complement the next stage. The counter output lead at 58 serves to drive the next counter 32, etc.

Each counter stage is reset by a positive transition at the base of the output transistor through a circuit from terminal 60, as shown for stage E.

External outputs for gating and control can be taken from either side of the counter stage such as the lead 49 shown for stage C. In this respect the signal at terminal 62 of stage D is used for internal feedback control to the reset terminals 63, 64 of stages B and C respectively to attain the 1–2–4–5 mode of counting. As seen in FIGURE 2, the positive transition of the fourth oscillator pulse 65 serves to quickly set and reset stages B and C from the transition of stage D, resulting in spikes 66, 67. The fifth oscillator pulse then causes all four stages to change state at time $t_A$.

This operation can be charted as follows as derived from the waveform polarity in the first five lines of FIGURE 2.

| OSC | B | C | D | E |
|---|---|---|---|---|
| 0 | + | + | + | + |
| 1 | − | + | + | + |
| 2 | + | − | + | + |
| 3 | − | − | + | + |
| 4 | − | − | + | + |
| 5 | + | + | + | − |
| 6 | − | + | + | − |
| 7 | + | − | + | − |
| 8 | − | − | + | − |
| 9 | − | − | − | − |
| 0 | + | + | + | + |

As shown in the first stage B of the counter, a drift control switch 70 is provided for causing pulses to drift to the left when in position 69 and to the right when in position 71. In operation the drift to the right is performed by coupling at circuit junction 72 the negative potential at 74. This causes the counter stage to operate as a single shot multivibrator in a self-resetting mode. As a result the count rate is effectively doubled as long as the switch is closed and synchronization is lost causing pulses 17, 18 on the display 14 (FIG. 1) to drift to the right.

Conversely if drift control switch 70 is closed upon lead 69, the negative potential at 74 is coupled to gating diodes at circuit junction 73, which blocks the entry of input pulses 29 and serves to decrease the count rate as long as the switch is closed. This results in a leftward drift of pulses on the display screen. This operation is shown in block diagram form 94 in FIGURE 1.

The central counter chain also serves to derive the precisely measured delay time for positioning the slave pedestal of blocks 21, 22. Digital time increments of tens of microseconds are selected by switches 80–83 which serve to code the respective output leads of counter stages B, C . . . RS into the delay coincidence network of 85, similar in operation to And circuit 48 to provide output waveform 87 with a transition at that time 0 designated by the setting of switches 81 to 83 when all the designated counter stage outputs are present simultaneously. This may be accomplished with a conventional diode coincidence circuit. This produces delay transition 87, which gates the corresponding oscillator pulse 88 in And circuit 86 to time the waveform in the same manner previously described to obtain accuracy related to the oscillator frequency which is synchronously locked onto the received pulses, without interposition of waveform distortions or delays in the counting chain 31–34.

To provide a continuous delay representing a range of 10 microseconds the variable period multivibrator 89 is provided. Since the single shot operation is triggered by the trailing edge of the oscillator waveform this occurs at 0+10 microseconds. The minimum pulse width is 10 microseconds and thus the output pulse 90 has a trailing edge occurring at 0+20 to 30 microseconds, which operates the slave synchronizing circuits 21 by way of lead 91. This timing relationship is shown during a period of several successive ten microsecond periods by the waveforms 92 and 93 as referenced to oscillator pulses 29. In this manner essentially a precision five digit selection is provided to correspond to the one-microsecond accuracy maintained in loran transmissions.

A typical preset switch connection is shown at lead 68 of FIGURE 4. As referenced on waveform E of FIGURE 2, the preset occurs for A–1, A–3, A–5 and A–7, as shown by connection of the switch rotor to terminal 67, which brings in the master reset pulse from the SPRR circuit. In the alternate connections 0, 2, 4, 6 and 8 the switch is connected to a reference potential source.

From the foregoing description of the system embodiment of the invention it may be recognized that a simplified and accurate loran receiver is produced having features of novelty believed descriptive of the nature and scope of this invention as defined in the appended claims.

What is claimed is:

1. A loran receiver timing and control system comprising in combination, a master oscillator, a loran signal receiver for producing transmitted loran pulses, means controlling the frequency of the oscillator to synchronize it with loran signal pulses received from a first loran station by said receiver, a multiple-stage binary counter chain operable from the master oscillator to give a plurality of different signal pulse indications at various periods corresponding to sub-multiples of the basic master oscillator frequency, synchronizing means including coincidence detectors operable responsive to selected groups of the counter chain signal indications establishing operational signals periodically occurring at basic loran pulse repetition rates, means resetting selected stages in said counter chain responsive to said operational signals, adjustable means presetting selected stages of said counter chain to shorten said periodically occurring operational signals by time increments modifying the basic rates to specific loran pulse repetition rates, adjustable metering means including coincidence detectors coupled to a plurality of the stages of said counter chain establishing periodically occurring signals from said counter chain at a plurality of specific selected counts within said specific pulse repetition rate period to thereby correspond in time to pulses received from a second loran station by said receiver, display means providing loran pulses from said receiver on a time reference scale synchronized from said operational signals with said basic pulse repetition rates, means responsive to the metering means for establishing a marker on said time scale referenced to its adjusted period, and drift control means for altering the count in said counter chain by adding and subtracting counts to provide a drift of said loran pulses in corresponding opposite directions across the time reference scale.

2. A system as defined in claim 1 wherein the oscillator supplies a signal frequency of 100 kilocycles, said counter chain provides signals representing division of the oscillator frequency by fifty, five hundred, five thousand and fifty thousand, said adjustable means presetting the counter stages operable responsive to periods including those established by the division by fifty and five hundred, and said adjustable metering means operable responsive to periods including those established by the division by five thousand and fifty thousand.

3. A system as defined in claim 2 wherein the counter chain comprises four sets of binary-coded-decimal counters operating in a 1–2–4–5 counting mode with the first stage receiving input signals at a complementing terminal, and each succeeding stage receiving divided signals from the preceding stage at a complementing terminal, the counter including feedback means responsive to divided signals at the complementing terminal of the third stage to change the state of the first and second stages following an input signal at the first stage causing said change of state and preceding the next successive input signal thereto.

4. A system as defined in claim 3, wherein the drift control means is coupled to the first stage of the first set of binary-decimal counters which is coupled to receive the 100 kilocycle signals as input signals, and comprises a potential source and means for selectively coupling the potential source to a left control circuit including a gate in the complementing input circuit of the first counter stage for blocking the 100 kilocycle signals and to a right control circuit including means for altering the voltage on the binary counter stage to cause it to self reset and thereby operate in a single shot mode to give output signals to the second counter stage for each 100 kilocycle input pulse rather than for two such pulses.

5. A system as defined in claim 1 including a timing gate responsive to input signals connected thereto from the synchronizing means and from the input stage of said counter chain thereby producing a gated timing signal designated in time by substantially the period of the input stage and having a trailing edge determined by the oscillator frequency previous to any delays in time encountered throughout the counting chain, and wherein the means resetting stages in the counter are responsive to the trailing edge of the gated timing signal.

6. A loran receiver system including a master oscillator and a frequency dividing counter chain therein for deriving pulse repetition frequencies for control and timing therein wherein the counter chain comprises a plurality of sets of binary-coded-decimal counters operating in the 1–2–4–5 mode with the first stage receiving input signals at a complementing terminal, and each succeeding stage receiving divided signals from the preceding stage at a complementing terminal, the counter including feedback means responsive to divided signals at the complementing terminal of the third stage to change the state of the first and second stages following an input signal at the first stage causing the change of state and preceding the next input signal thereto.

7. A loran receiver system including a master oscillator synchronously controlled from received loran signals and a frequency dividing multi-stage counter chain therein for deriving pulse repetition frequencies for system control and timing including display means presenting the received loran signals on a time scale synchronized with the pulse repetition frequencies including a drift control circuit operable upon an early stage in said counter chain for causing the received loran signals to pass in two opposite directions across the time scale, said early stage having a binary counter with an input complementary terminal connected for receiving pulses derived from said oscillator, the drift control circuit comprising a source of potential, a control selection circuit for drift in one direction comprising an inhibiting gate in said complementary circuit blocking the passage of input pulses responsive to selective application of said source of potential to thereby effectively reduce counting speed, and a control selection circuit for drift in the opposite direction comprising a circuit connecting said potential source to the binary counter to cause it to self reset in response to an input pulse and thereby operate as a single shot multivibrator to thereby effectively increase counting speed by providing output pulses for every input pulse rather than for every other input pulse.

8. A loran receiver system including a master oscillator synchronously controlled from received loran signals and a multi-stage counter chain coupled for dividing the oscillator frequency to produce pulse repetition frequencies for system control and timing, including coincidence circuits for determining the condition of a plurality of stages in said counter chain to derive a periodic signal providing a basic pulse repetition rate and means presetting a plurality of stages early in said counter chain to modify the basic pulse repetition rate and establish a specific pulse repetition rate.

9. A system as defined in claim 8 wherein the counter chain comprises a series of binary-coded-decimal counters coupled in a 1–2–4–5 operational mode, and the pulse repetition frequencies selected comprise periods derived from dividing the oscillator frequency by five.

10. A system as defined in claim 8 including means gating with a periodic signal defined by the state of a plurality of stages in said counter chain master timing pulses derived from an early stage in the counter chain thereby deriving pulses before significant delay or shape modification occurs to change the timing of the master oscillator pulses from synchronous relationship with transmitted loran pulses to produce thereby a short control waveform with the trailing edge conformed to the oscillator period thereby establishing accurate system timing control.

References Cited

UNITED STATES PATENTS

| | | | |
|---|---|---|---|
| 2,521,350 | 9/1950 | Dickinson | 235—92 |
| 2,523,244 | 9/1950 | Woodward | 343—103 |
| 2,566,933 | 9/1951 | Dickinson | 235—92 |
| 2,614,159 | 10/1952 | Freas | 343—103 X |
| 2,630,969 | 3/1953 | Schmidt | 235—92 |
| 3,201,687 | 8/1965 | Pasquier, et al. | 343—103 X |

RODNEY D. BENNETT, *Primary Examiner.*

H. C. WAMSLEY, *Assistant Examiner.*